(No Model.) 6 Sheets—Sheet 1.

L. K. JOHNSON & A. A. LOW.
TYPE DISTRIBUTING APPARATUS.

No. 360,097. Patented Mar. 29, 1887.

(No Model.) 6 Sheets—Sheet 3.

L. K. JOHNSON & A. A. LOW.
TYPE DISTRIBUTING APPARATUS.

No. 360,097. Patented Mar. 29, 1887.

(No Model.)  6 Sheets—Sheet 4.

L. K. JOHNSON & A. A. LOW.
TYPE DISTRIBUTING APPARATUS.

No. 360,097.  Patented Mar. 29, 1887.

(No Model.) 6 Sheets—Sheet 5.

L. K. JOHNSON & A. A. LOW.
TYPE DISTRIBUTING APPARATUS.

No. 360,097. Patented Mar. 29, 1887.

(No Model.) 6 Sheets—Sheet 6.
L. K. JOHNSON & A. A. LOW.
TYPE DISTRIBUTING APPARATUS.

No. 360,097. Patented Mar. 29, 1887.

Witnesses:
Wm Gardner.
Wm A. Pollock

Inventors:
Louis K. Johnson,
A. Augustus Low,
By their attorney
Geo. W. Miatt

UNITED STATES PATENT OFFICE.

LOUIS K. JOHNSON AND A. AUGUSTUS LOW, OF BROOKLYN, ASSIGNORS TO THE ALDEN TYPE MACHINE COMPANY, OF NEW YORK, N. Y.

TYPE-DISTRIBUTING APPARATUS.

SPECIFICATION forming part of Letters Patent No. 360,097, dated March 29, 1887.

Application filed March 9, 1886. Serial No. 194,604. (No model.)

*To all whom it may concern:*

Be it known that we, LOUIS K. JOHNSON and A. AUGUSTUS LOW, citizens of the United States, residing in the city of Brooklyn, in the county of Kings and State of New York, have invented certain new and useful Improvements in Type-Distributing Apparatus, of which the following is a specification.

Our invention relates to the class of type-distributers in which the types are finally deposited in prescribed positions with relation to each other in continuous lines within type-containing channels, which are removable and are adapted for use in the type "setter case" described in our United States Patents No. 271,711, dated February 6, 1883, No. 230,784, dated August 3, 1880, No. 254,019, dated February 21, 1882, and No. 279,168, dated June 12, 1883.

Our present improvements may be said to relate more especially to the form of apparatus shown and described in our applications Nos. 171,366 and 191,824, although the principle of handling types in distribution involved may be employed with advantage in other forms of type-distributing apparatus.

For convenience we will refer to our improvements as applied to substantially the same form of apparatus shown in our applications above named; and as the general form and arrangement of our class of type-distributing apparatus is now so well known, by reason of former applications and patents, it will only be necessary in the accompanying drawings to show sufficient of the apparatus to illustrate the principle and operation of the present invention.

Heretofore each type distributed has descended its vertical type-conduit in the apparatus until its heel rested upon the bottom of the type-containing channel underneath, in which latter channel it was forwarded by the action of a reciprocating pusher or forwarder.

As mentioned in former applications, difficulty has heretofore been experienced in keeping the requisite space in the channel at the bottom of the vertical conduit open and clear for the descent of the next succeeding type, owing to the tendency of the last type to return or fall back with the retractile movement of the forwarder, thereby not only exposing its face to injury from the heel of a succeeding type, but also tending to derange the latter in position with relation to the others. This objectionable tendency of the types to backward vibration is augmented in a long column by the natural "backlash" or elasticity exerted by the column against the action of the pusher, as heretofore described by us.

The main object of our present invention is to obviate these objectionable features, not by preventing the retractile vibration and backlash, but by rendering both harmless; and the invention consists, first, in causing each type to descend so that its heel rests temporarily upon a raised step or platform at the lower extremity of the conduit and above the floor of the type-containing channel until forwarded in the latter by the pusher, when it drops down into the channel in front of such platform, which then acts as a positive shoulder or abutment, against which the type is free to vibrate or backlash without interfering in any way with succeeding types. This is the arrangement of parts for the left-hand division of the bank, upon which side the majority of types constituting the denominations most frequently used in ordinary distribution are deposited in receiving-plates, which guide them to the vertical conduit-plates, by which they are conducted to the receivers.

It will be recalled that by the use of the receiving-plates, formed with comparatively wide receivers or cups, the types may be successively dropped from between the thumb and fingers without the necessity of handling each type separately or one at a time—that is to say, four, five, or more types, constituting, for instance, a word, may be held between the thumb and finger and successively released, one at a time, and dropped into the appropriate receivers with but slight movement of the thumb and finger. On the other hand, the denominations of type which are provided for upon the right-hand division of the bank are usually those which are infrequently used, such as capitals and denominations which do not ordinarily constitute portions of words, but are individual and distinct in their use, so that they may be conveniently handled separately.

For this reason a feature of our present invention consists in dispensing with the vertical conduit-plate upon the right side of the bank and substituting therefor a series of stationary shoulders or abutments, which enter the receiving ends of the channels and afford a means of forwarding the types in the channels, by inserting the types successively, by hand, into the channel between the said stationary shoulder or abutment and the preceding types. We are thus enabled to materially simplify and cheapen the construction of our apparatus, since we not only dispense with one conduit-plate, but also with one half or series of pusher-fingers upon the reciprocating pusher or forwarder.

In our last application, No. 191,824, before referred to, we describe and claim a face-plate common to all the superposed receiving-plates and formed with ribs or projections, which constitute continuations of the floors of the receiving-channels, said face-plate being used in conjunction with a vertical conduit-plate, between the conduit side walls of which the said ribs upon the face-plate projected more or less, according to the thickness of type to be distributed.

In our present application we modify the form of or dispense with the stationary vertical conduit-plate and substitute therefor a plain stationary vertical plate without conduits, and form the vertical conduits directly in the opposed surface of the receiver face-plate in such manner that when the latter is brought into position against the stationary plate continuous vertical conduits, inclosed upon all four sides, will be afforded for conducting the types into the containing-channels below.

In order to avoid the necessity of removing and substituting the face-plates where the apparatus is designed for the distribution of types of comparatively great difference in width—say, for instance, pica and agate—we in some cases form the said face-plate type-channels of different width, one within the other. For instance, in the bottom or floor of the groove for the larger type we form a much narrower central groove for the accommodation of the smaller type. The secondary or smaller groove being centralized with relation to the larger, leaves two ridges, one upon either side of the large channel, upon which the larger types will descend as readily as upon a complete and uniform floor, while the smaller types descend in a groove or conduit of the usual form.

In this connection our invention includes means for adjusting the receiver face-plate vertically, so as to bring either the narrow series or the wider series of grooves or channels therein into coincidence with the lower ends of the type-passages in the receiver-plates; also in beveling the upper side walls of the narrower channels, so that they will connect with and form continuations of the side walls of the said type-passages in the receivers. By this means we prevent all undue play or looseness in the descent of the narrower types, and adapt the face-plate to the distribution of a greater variety of type, since each channel or size of conduit, both the primary and secondary, will be adapted to control with certainty two or three widths of type, the variation in width between certain kinds being but slight.

Our invention includes means for adjusting the stationary plate against which the types descend (and which by its position prescribes their point of entrance into the type-containing channels below) with relation to the position and stroke of the vibrating type forwarder or pusher, for the purpose of regulating and controlling the transfer of the types with greater accuracy than heretofore under all circumstances. By changing the position, horizontally, of the vertical type-plate, the degree to which the pusher-fingers project beyond it in their forward movement, and consequently the type-receiving space in the containing channel, will be varied accordingly, the object being to proportion such stroke and space to the thickness of the types under treatment.

It is to be understood that our new and elevated temporary rests or platforms in the receiving ends of the channels, and the consequent new method of transferring the types from the vertical conduit-plates to the containing-channels, may be used in conjunction with either the old or the new form of vertical conduit-plates, and also that the horizontal adjustment of the stationary type-plate with relation to the forwarder may also be applied with equal advantage to the old form of vertical conduit-plate having the type-channels formed in its face.

In addition to making the vertical type-plate adjustable horizontally with relation to the pusher, as above stated, a final feature of our present invention consists in mounting the said plate in such manner that it may be slid back bodily away from the receiver face-plate, for the purpose of giving access to the receiving ends of the type containing channels below, when desirable.

In the accompanying drawings.

A series of superposed receiving-plates, A, constructed and arranged in the manner shown and described in the application hereinbefore referred to, are mounted upon a carriage or frame and provided with a common vertical face-plate, B, secured to the forward part of the carriage or frame, and formed with offsets $b\,b$, corresponding to the difference in the position of the lower extremities of the type-channels $a$ in the receiving-plates A. This face-plate B is arranged and operated substantially like that shown and described in our last application, No. 191,824, excepting that the projecting ribs $b'$ in the present construction constitute the side walls of the type-conduits $b^2$, the floors of which coincide with and form continuations of the floors of the type-passages $a$ in the receiving-plates A, behind the upper ends of the conduit-floors $b^2$, being curved so as to allow the types to conform gradually and gently to the change in direction.

The plate B may be formed either with single conduits, as shown in Figs. 1, 2, 3, and 5, or with double conduits, as shown in Figs. 6, 7, 8, 9, 10, 11, 12, and 13.

When the secondary or supplemental grooves $b^3$ are used, they are centralized, so as to leave the ridges $b^4$ on either side, which then constitute the bottom or floor of the primary or larger grooves, $b^2$. As before mentioned, these secondary channels are designed for the purpose of more effectually confining and controlling the descent of smaller sizes of types, while they in no way interfere with the descent of the larger sizes in the primary channels $b^2$.

Figures 6, 7:
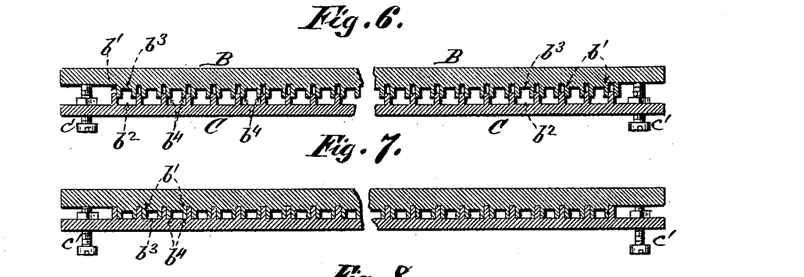
Fig. 6 is a horizontal section of opposite ends of a receiver face-plate and opposed stationary plate, the receiver-plate being formed with two series and sizes of type-conduits, one within the other.
Fig. 7, a similar view showing the parts brought together so as to leave only the smaller or secondary type-conduits available.
Figure 8:
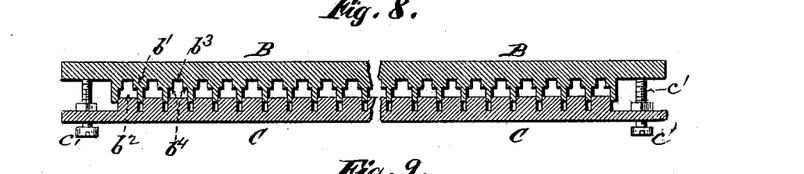
Figs. 8 and 9 are respectively the same as Figs. 6 and 7, excepting that they show an alternative mode of forming the opposed plates to effect the same result.
Figure 9:
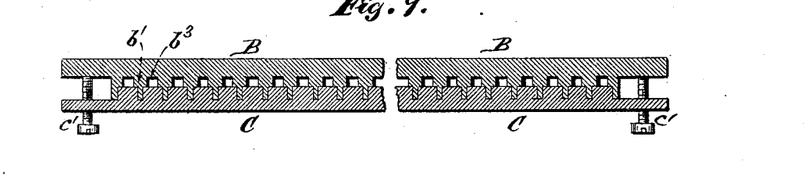

For the larger sizes of types, the plate B is held at a proper distance from the plate C by means of adjustable stops $c'\,c'$, as shown in Figs. 6 and 8, while for the smaller sizes of types it is brought up squarely against the plate C, as shown in Figs. 7 and 9.

It is to be understood that different series of type-containing channels are to be used in connection with each series of conduits or grooves, corresponding in width to the latter.

Figure 10:
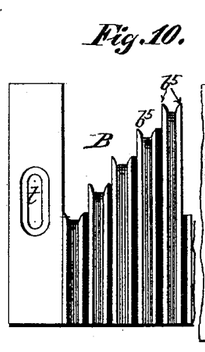
Figs. 10 and 11 are elevations of portions of the opposed surfaces shown in Figs. 6 and 7, and Figs. 12 and 13 similar views of the corresponding surfaces shown in Figs. 8 and 9.
Figure 11:
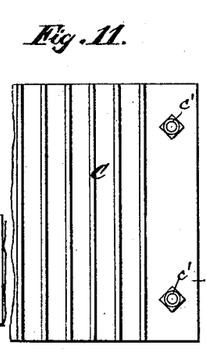
Figures 12, 13:
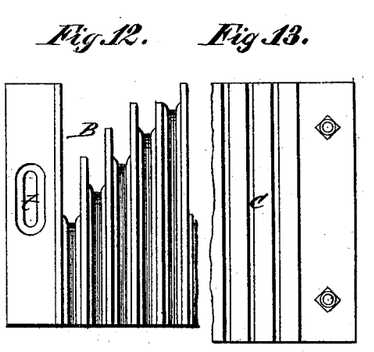
Figure 14:
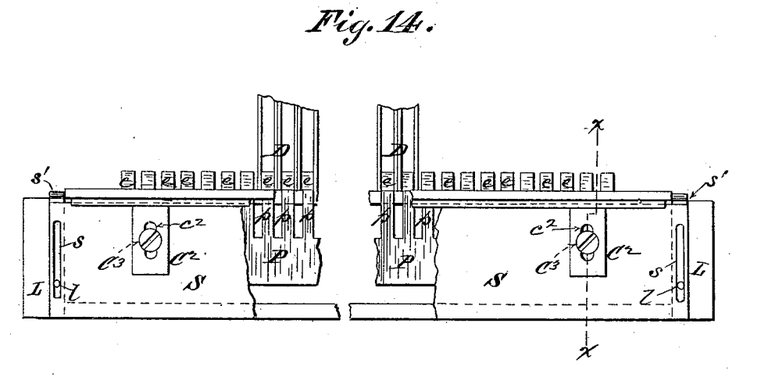
Fig. 14 is a plan, with the central portion broken away, of adjoining portions of the apparatus sufficient to illustrate the horizontal adjustment of the stationary type-plate with relation to the type-forwarder.
Figure 15:
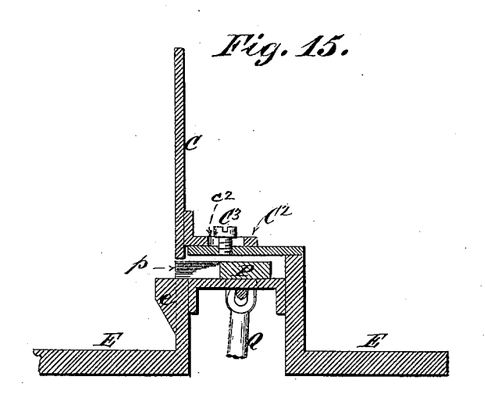
Fig. 15 is a vertical section upon plane of line $x\,x$, Fig. 14.

In order to adapt the secondary series of grooves or conduits $b^3$ more perfectly to the receiver-plate passages $a$, and thereby obviate the need for more than one set of receiving-plates, we make the upper side walls, $b^5$, beveled, as shown in Figs. 10 and 12, so that when the grooves $b^3$ are brought into coincidence with the grooves $a$ in the receiver-plates the side walls will be connected and continuous, and present no shoulder or obstruction to the passage of the types.

Figures 16, 17:
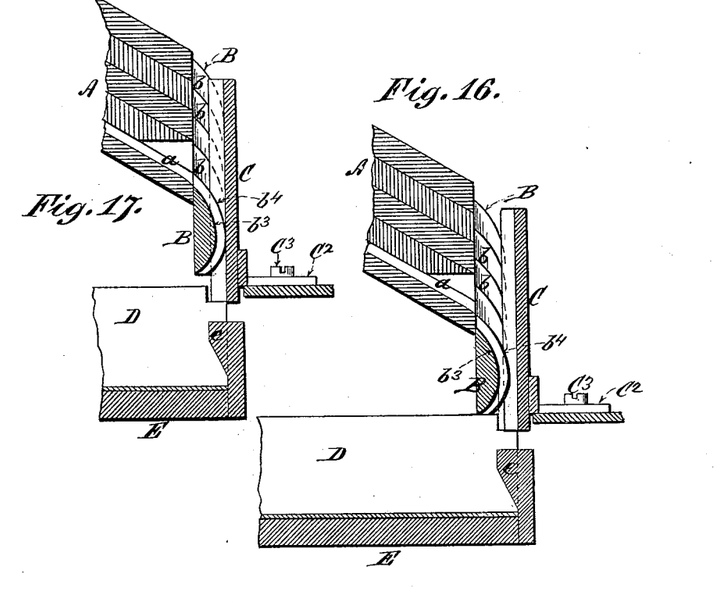
Fig. 16 is a vertical section of the lower portions of the receiver-plates, receiver face-plate, and adjoining parts, showing the face-plate adjusted to receive the types into its primary or widest grooves or conduits, the face-plate and opposed vertical plate being relatively situated, as shown in Fig. 6.
Fig. 17, a view like Fig. 16, excepting that it shows the receiver face-plate adjusted so as to receive the types into the secondary grooves or conduits, the face-plate and the opposed vertical plate being relatively situated, as shown in Fig. 7.
Figure 18:
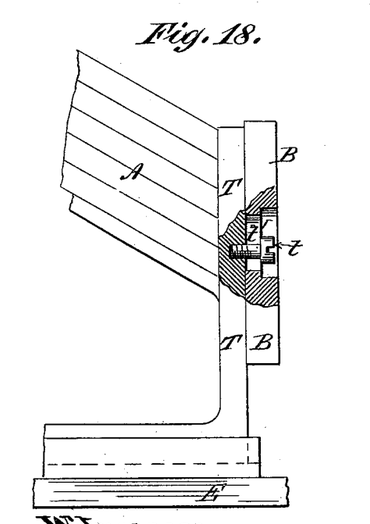
Fig. 18 is a side elevation of a portion of the sliding frame or carriage which supports the receiver-plates and their face-plate, a portion of the latter and an adjoining portion of the standard upon which it is supported at that end being broken away to show means of effecting the vertical adjustment of the receiver-plate.
Figure 19:
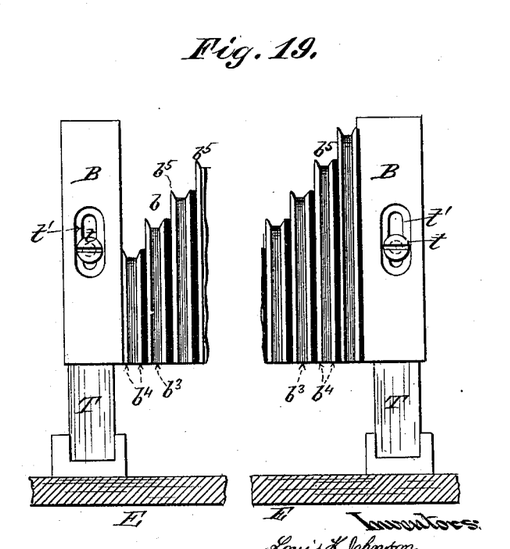
Fig. 19 is a front elevation of opposite extremities of the receiver face-plate, further illustrating means provided for effecting its vertical adjustment.
Figure 20:
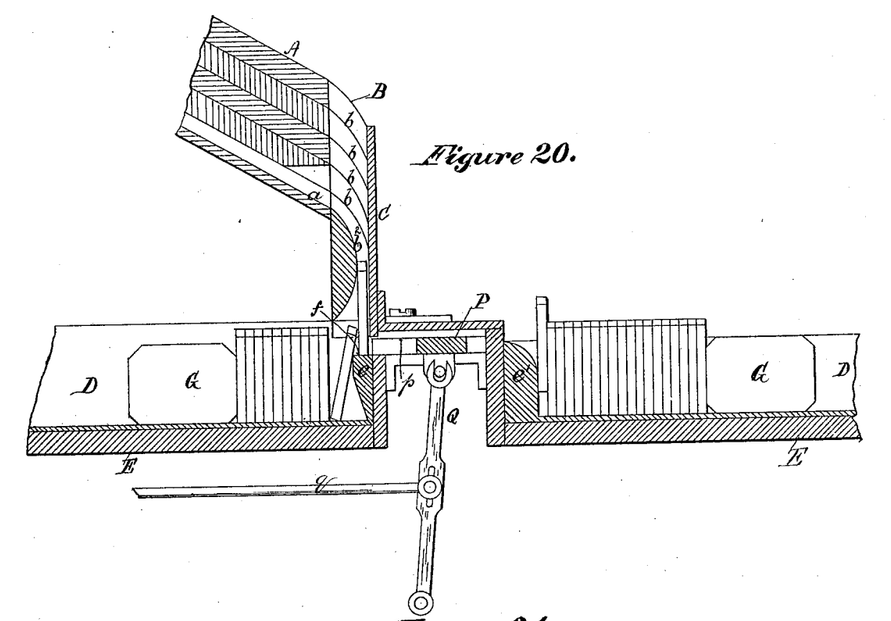
Fig. 20 is a vertical longitudinal section, similar to Fig. 2, representing the type-shoulders as forming permanent portions of the channels.
Figure 21:
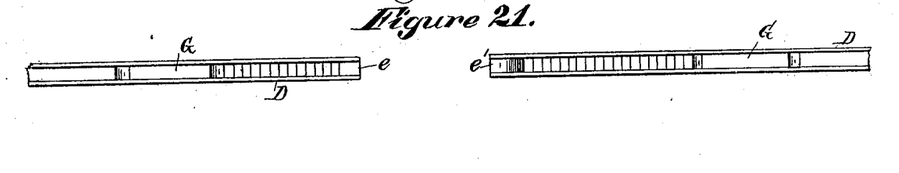
Fig. 21 is a top view of the ends of the channels shown in Fig. 20.

When it is desired to change from one size of groove to another, the face-plate B is adjusted vertically upon its support or frame T, so as to bring the bottoms or floors of the required series of grooves $b^2$ or $b^3$, as the case may be, into proper position to form continuations of the floor of the type-channels $a$ in the receiver-plates A. The two positions are illustrated in Figs. 16 and 17. Any suitable means for effecting this vertical adjustment of the face-plate B may be substituted for that shown in the drawings, in which set-screws $t$, passing through elongated slots $t'$ formed in the face-plate, bind the latter in the prescribed position against the frame or standard T. The sliding and supporting frame T is substantially the same in construction and operation to that shown and described in our last application, No. 191,824, and therefore need not be further described here.

When desired for use, the face-plate B is brought into position against the stationary vertical plate C, which thereby is made to complete the four side walls for the conduits $b^2$ or $b^3$, as will be understood by reference to Figs. 2, 3, 6, 7, 8, and 9.

Other forms of adjustable stops or buffers, $c'$, may be substituted for the screws shown, if preferred.

The plate C is horizontally adjustable upon the apparatus in such manner that it may be varied slightly in position with relation to the position and stroke of the pusher. This may be accomplished by any suitable means. As shown in the drawings, the plate C is attached to rearwardly-projecting horizontal flanges or feet $C^2$, which are formed with longitudinal slots $c^2$, through which the set-screws $C^3$, screwing into a stationary part of the apparatus, pass.

Since the receiver face-plate B is governed in position when in use by the position of the plate C, or the stops $c'$ thereon, it is obvious that any variation in the position of the plate C will not alter the relation of the two plates to each other, and the only effect of an adjustment of the plate C will be to correspondingly increase or diminish the degree to which the pusher passes beyond the face of the plate C in its forward movement, and consequently the space left, when the pusher recedes, between the said face of the plate C and the last type forwarded in the channel. By this means the receiving or type entering spaces in the containing-channels D may be regulated with relation to the requirements arising from the difference in thickness between different sizes or fonts of types to be distributed.

The lower extremity of the face-plate B extends down to the position of the upper edges of the type-containing channels D, when the latter are in position upon the table E upon this (the left-hand) side of the receiving-bank. The receiving ends of the type-channels D extend inward to the line of the vertial plate C, or nearly so, and they are held against lateral displacement when in such position by the stationary tongues or projections $e$, which project into the channels. The upper sides of these projections are made horizontal, or nearly so, so as to each form a step or platform, $f$, which projects into the path of the descending types, and is broad enough to sustain and support them.

We are aware that in former applications for patent we have shown the type-channels as centralized and held by projections which entered the receiving ends of the channels, and we do not seek herein to claim such interior shoulders or projections, broadly; but in the former constructions mentioned these interior projections were designed solely for the purpose of centralizing and holding the channels, and did not project into the path or affect the descent of the types in any manner directly.

Figures 1, 4:
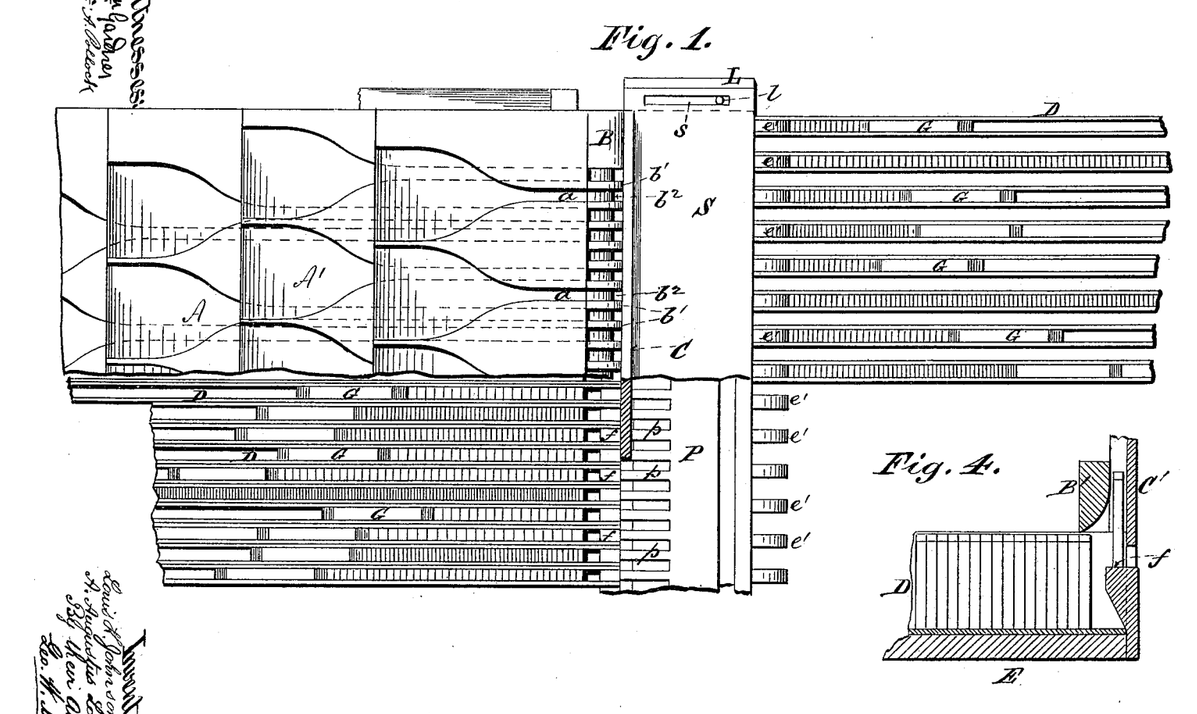
Figure 1 is a plan of adjoining portions of a double receiver-bank, the receiver-plates and other parts upon the left-hand side being broken away to show the type-receiving platforms, single comb-pusher, &c.
Fig. 4 is a sectional view illustrating the use of the temporary type step or platform in conjunction with the old form of stationary vertical type-conduit plate and lower face-guard.
Figures 2, 3, 5:
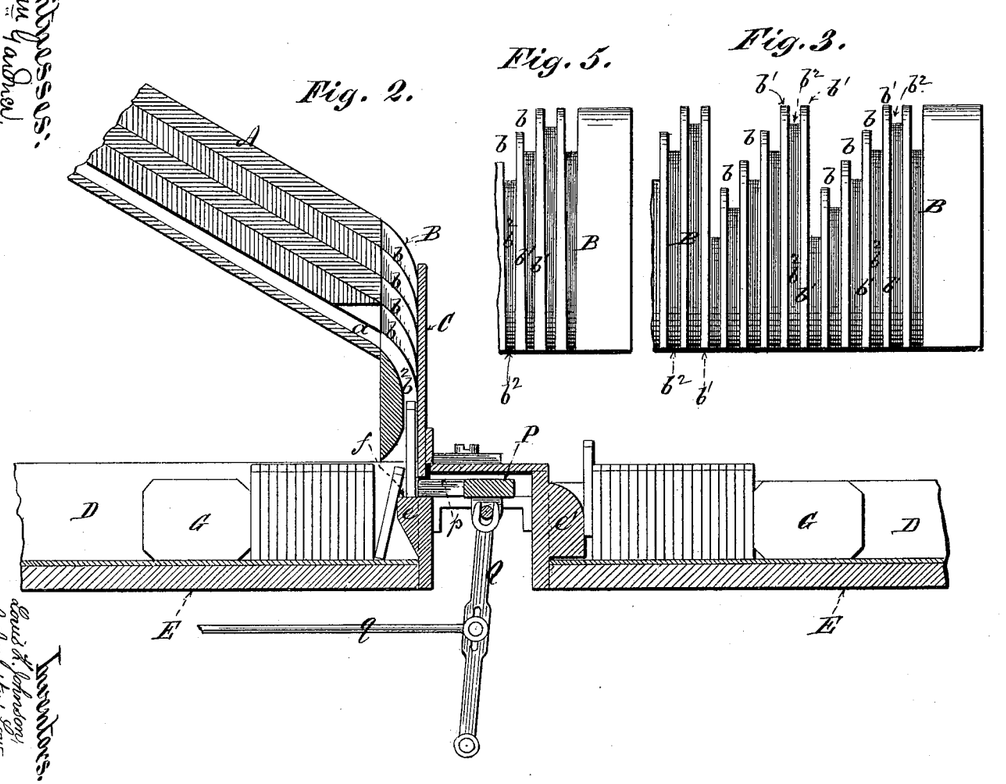
Fig. 2 is a vertical section illustrating the new means for depositing and forwarding the types in the containing-channels.
Fig. 3 is a front view of a portion of the receiver face-plate, formed with vertical type-conduits.
Fig. 5 is a view similar to Fig. 3, showing the side walls of the conduits in the face-plate made to converge toward the bottom of the plate to conform to type-channels of less than the maximum width.

The essential feature in our present construction is the formation of a platform or rest, $f$, directly in the path of the descending types, and above the floors of the type-receiving channels D, as shown in Figs. 2 and 4. A type having descended through a conduit, $b^2$, rests with its heel upon the step or shoulder $f$ until forwarded into the channel by the reciprocating pusher P. The type is supported in an upright position upon the rest $f$ by the surrounding side walls of the conduits $b^2$ (see Figs. 2 and 4) until one of the pusher-fingers $p$ of the reciprocating pusher P encounters the type at or near its heel, which is thereby slid off the outer edge of the step or rest $f$, thereby permitting the type to drop by its own gravity bodily into the containing-channel D until its heel rests in turn upon the floor of the latter. The continued forward movement of the pusher-finger $p$ forwards the type the prescribed distance in the channel and then recedes, leaving a space between the proper upright position of the type just forwarded and the outer edge of the rest $f$ sufficient to accommodate the body of the next succeeding type; but should the last type fall back during the retractile movement of the pusher P until it rested against the outer edge of the rest or shoulder $f$, as illustrated in Fig. 2, the latter prevents its protruding into the path of the heel of the next succeeding type. The succeeding type, as it is in turn forwarded by the pusher, will raise the preceding one so inclined without interfering with its own descent, since the free space created by the stroke of the pusher is sufficient to give the types free movement and play.

The lower extremity of the receiver face-plate B (or of the lower front guard, B', when the old form of vertical conduit-plate C' is used, as illustrated in Fig. 4) is curved or chamfered, substantially as shown, in order to give clearance to the head of the type as it leaves the temporary step or shoulder $f$. The pusher P is reciprocated in any usual or convenient manner, the means indicated in the drawings being the bifurcated rocking lever Q, operated through a connecting-rod, $q$, by means of a crank or eccentric, as shown and described in our former applications for patents. In the present case, however, the pusher is provided with only a single series of pusher-teeth for the left-hand side of each bank, the types distributed upon the right-hand side of the bank being placed directly in the containing-channels by hand in such manner as to simultaneously forward the column of type therein. To accomplish this, we make the internal stationary projections, $e$, upon this side of the bank answer the purpose of fulcrums or points of resistance—that is to say, the stationary tongues or projections $e'$ not only centralize the receiving ends of the channels D and hold them against lateral movement or displacement, but also act in the nature of type-forwarders, since by inserting a type between any one of them and the inner end of a type-column the latter will be forwarded a distance equal to the thickness of the type inserted. This action is illustrated in Fig. 2.

To facilitate the insertion of the types, the upper part of each tongue or projection $e'$ is preferably curved or inclined, so as to guide the heels of the types into proper position. The usual slug, G, is placed in front of the type column, and the side walls of the channel are preferably both made less than "type-high" to facilitate the insertion of the types by the fingers.

It is obvious that both the shoulders $e\ f$ and $e'$ may be formed in or upon the ends of the type-channels themselves, if preferred, without altering the principle involved in either case, the channels being centralized and held in position by other means.

Where the apparatus is designed to be used for the distribution of types of different sizes, the face-plates B may be, if preferred, made interchangeable, those for the smaller sizes of type being formed with the side walls, $b'$, of the conduits $b^2$ converging downward to the bottom of the plate, as indicated in Fig. 5, in order to meet and form continuations of the side walls of the type-containing channels in the same manner and for the same reasons described in our application No. 171,366, when referring to the lower section of the vertical conduit-plate.

In order to give ready access to the pusher-fingers, the receiving ends of the type-containing channels, &c., below the plate S, upon which the vertical type-plate C is mounted, is adapted to slide horizontally upon its bearings or supports L L. For this reason, and to prevent longitudinal motion, it is formed with transverse slots $s\ s$, which engage with pins or studs $l$ upon the supports L and permit of the plate being slid back and forth.

Permanent stops $s'$ prescribe the forward or normal position of the plate S, so that the adjustment of the type-plate upon its support and with relation to the pusher is not affected by the sliding of the said plate S back or forth.

What we claim as our invention, and desire to secure by Letters Patent, is—

1. In a type-distributing apparatus, substantially such as designated, the combination, with a series of superposed type-receiving plates and with a series of type-containing channels, of a receiver face-plate formed with type-conduits and an opposed stationary plate, the said parts being arranged substantially in the manner and for the purpose described.

2. In a type-distributing apparatus, substantially such as designated, the combination, with a type receiving and conducting channel above and with a type-containing channel below and with mechanism, substantially such as described, for forwarding the types in the said containing-channel, of an intermediate shoulder or type-rest projecting into and above the floor of the said type-containing channel, substantially in the manner and for the purpose described.

3. In a type-distributing apparatus, substantially such as designated, in combination with a series of superposed type-receiving plates above and a series of type-containing channels below, a receiver face-plate formed with type-conduits which coincide with the receivers above and have converging side walls which coincide with the side walls of the type-containing channels below, substantially in the manner and for the purpose described.

4. In a type-distributing apparatus, substantially such as designated, the combination, with a series of type-containing channels and with a reciprocating type-forwarder and the type-plate C, down the face of which the types descend to the receiver-channels, of means, substantially such as described, for adjusting the said type-plate C with relation to the position and stroke of the type-forwarder, substantially in the manner and for the purpose described.

5. In a type-distributing apparatus, substantially such as designated, a type-conduit plate formed with two series of type-conduits, the secondary or smaller series being centralized with relation to the primary or larger series, substantially in the manner and for the purpose described.

6. In a type-distributing apparatus, substantially such as designated, the combination, with a series of type-receiving plates and a face-plate formed with two series of centralized grooves or conduits, of means, substantially as described, for adjusting the said face-plate with relation to the said receiving-plates, substantially in the manner and for the purpose described.

7. In a type-distributing apparatus, substantially such as designated, the combination, with a series of superposed type-receiving plates, of a face-plate formed with two series of centralized type grooves or channels, the upper side walls of the narrower series of which are beveled or flared, for the purpose of coinciding with and forming continuations of the type-passages in the said type-receiving plates, substantially in the manner and for the purpose described.

8. In a type-distributing apparatus, substantially such as described, the combination, with a series of receiver-plates, an intermediate face-plate, a series of type-containing channels, and a type-forwarding device, substantially such as described, of a vertical type-controlling plate, and means, substantially such as described, for adjusting it horizontally back and forth upon the frame of the apparatus, for the purpose and substantially in the manner described.

LOUIS K. JOHNSON.
     A. AUGUSTUS LOW.

Witnesses:
 GEO. W. MIATT,
 WM. GARDNER.